(Model.)

A. LAWRENCE.
CLOCK ESCAPEMENT.

No. 280,936.      Patented July 10, 1883.

WITNESSES.
L. J. Cherrington
Chas. A. Gaudette

INVENTOR.
Alvin Lawrence

UNITED STATES PATENT OFFICE.

ALVIN LAWRENCE, OF LOWELL, MASSACHUSETTS.

CLOCK-ESCAPEMENT.

SPECIFICATION forming part of Letters Patent No. 280,936, dated July 10, 1883.

Application filed September 9, 1882. (Model.)

*To all whom it may concern:*

Be it known that I, ALVIN LAWRENCE, a citizen of the United States, residing at Lowell, in the county of Middlesex and State of Massachusetts, have invented a new and useful Improvement in Clock-Escapements, of which the following is a specification.

My invention consists in constructing the escapement-wheel of a clock with teeth, having one or more radial slots extending from an annular slot in the rim of said wheel, near the base or junction of said teeth with the said rim, said slots in the teeth extending to the outer end of the teeth and terminating in a capillary point. The purpose of the slots in the teeth is to receive and convey oil or other lubricating substance to the point of the teeth in their frictional contact with the pallet in the movement of the escapement mechanism.

Figure 1:
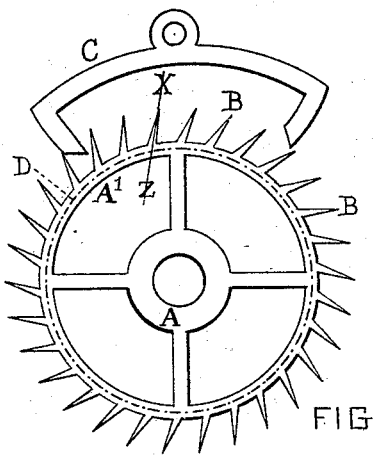
Figure 2:
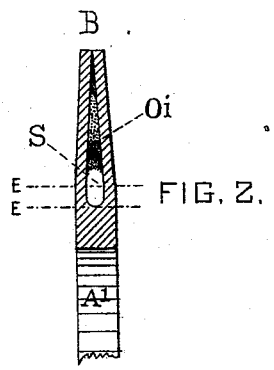

My invention is fully shown in the accompanying drawings, of which Figure 1 is a side elevation of the escapement-wheel A A' of a clock, with its engaged pallet C; and Fig. 2 is a radial section of the rim at A', Fig. 1, and one of the teeth B of same, through line X Z, Fig. 1, and showing the capillary pointed slot S and volume of oil O*i*.

In the revolution of the escapement-wheel and the engagement of its teeth with the pallet C it is obvious that the oil O*i* within the slot S will come in contact with the frictional surfaces of said teeth and pallet, and thereby lubricate the contacting-surfaces, prevent wear, and make the movement easier, which are advantages over the ordinary unslotted wheel. For the purpose of a reservoir for a greater quantity of oil than the slot in the teeth will hold, an annular slot is formed on the rim of the wheel, and connecting with the slot in the teeth. The bottom of said annular slot is shown by the dotted circle D on the rim, Fig. 1, and its width by space between dotted lines E E, Fig. 2. The said slot on the rim also allows the oil to flow from one tooth to another, and will supply oil to the point of any tooth by capillary attraction so long as there is any oil to flow.

I make my improved escapement-wheel in two ways. One is to take two escapement-wheels already cut or toothed. Then face or true up one side of each of the same, so they will form one if secured together, and before removing them from the lathe-chuck take from the teeth and rim of each enough to form half the slots and reservoir, as shown in Fig. 2. The two sections are then to be soldered or pinned together, with a slight coat of shellac, to prevent the oil from leaving reservoir; second, the wheel may be made by cutting an annular groove in an ordinary wheel-blank, and then closing the groove at its outer edge and cutting the teeth. The lubricant will introduce itself to reservoir if dropped on the wheel between the teeth.

In making a slot in the teeth or rim I do not confine myself to any particular shape, provided the said slot extends out to and conveys the oil to the point of the tooth and its contact with the pallet, whatever their form or movement.

I claim—

1. A clock-escapement with a wheel having one or more slotted teeth, the slots extending out to the point of said teeth, as and for the purpose or purposes described and set forth.

2. A clock-escapement with a wheel having an annular slot around the rim, as and for the purpose described and set forth.

3. A clock-escapement with a wheel having one or more slotted teeth, the slots in said teeth combined and communicating with an annular slot in the rim of said wheel, forming a reservoir, for the purpose or purposes described and set forth.

ALVIN LAWRENCE.

Witnesses:
LE ROY J. CHERRINGTON,
L. H. BONNER.